United States Patent [19]

Kontis

[11] 4,183,510
[45] Jan. 15, 1980

[54] SPRING BUFFER
[75] Inventor: George E. Kontis, South Burlington, Vt.
[73] Assignee: General Electric Company, Burlington, Vt.
[21] Appl. No.: 844,160
[22] Filed: Oct. 21, 1977
[51] Int. Cl.² ............................................. F16F 1/52
[52] U.S. Cl. ..................................... 267/70; 89/44 R; 267/135; 267/136; 267/169
[58] Field of Search ................. 89/37 GM, 44 R, 177, 89/198; 267/60 R, 139, 161, 162, 169, 170, 174, 69, 70, 71; 213/40 R, 40 D

[56] References Cited
U.S. PATENT DOCUMENTS
988,782   4/1911   Huston .................................... 267/60

Primary Examiner—Stephen C. Bentley
Attorney, Agent, or Firm—Bailin L. Kuch

[57] ABSTRACT

A feature of this invention is a positively assembled, double acting spring buffer having all spring guides disposed within and extending the full length of the spring assembly.

14 Claims, 6 Drawing Figures

SPRING BUFFER

BACKGROUND OF THE INVENTION

1. Field of the Invention

This invention relates to spring buffers for high speed reciprocating mechanisms, and particularly to a recoil adapter for a high rate of fire, recoiling gun mechanism.

2. Prior Art

The purpose of the recoil adapter is to isolate the gun, as much as possible, from the structure of the installation. The conventional recoil adapter comprises a spring or spindle assembly, a housing and a spindle retainer. A discussion of the design of such recoil adapters is found in "Final Summary Report, Model D Vulcan M61 (TI71E3) and T171E2 20 mm Automatic Guns", pp 5-30 through 5-38, July 31, 1959, contract DA-30-115-ORD-1 by General Electric Company. Another discussion is found in "Ringfeder Friction Springs In Mechanical Engineering Applications," Catalogue R53A, May 1975, by Ringfeder Corporation. Buffer units are shown in U.S. Pat. No. 1,120,714 issued to G. G. Hinsdale on Dec. 15, 1914; U.S. Pat. No. 1,317,788 issued to G. G. Hinsdale on Oct. 7, 1919; U.S. Pat. No. 2,876,681 issued to K. W. Maier on Mar. 10, 1959; U.S. Pat. No. 2,638,339 issued to M. P. Taylor on May 12, 1953; U.S. Pat. No. 2,962,935 issued to E. Hepperle on Dec. 6, 1960; U.S. Pat. No. 3,169,757 issued to J. Roder et al on Feb. 16, 1965; and U.S. Pat. No. 3,894,473 issued to M. Marest et al on July 15, 1975.

SUMMARY OF THE INVENTION

It is an object of this invention to provide a recoil adapter wherein the diameter of the spring assembly is maximized within the diameter occupied by the total adapter.

It is another object of this invention to provide a recoil adapter wherein the maximum diameter of the adapter is equal to the maximum diameter of the spring assembly.

It is yet another object of this invention to provide a recoil adapter having no housing and a minimum number of parts.

A feature of this invention is a positively assembled, double acting spring buffer having all spring guides disposed within and extending the full length of the assembly.

BRIEF DESCRIPTION OF THE DRAWINGS

These and other objects, advantages and features of the invention will be apparent from the following specification taken in conjunction with the accompanying drawing in which:

FIG. 1A is an end view of the spindle tube of FIG. 1;

FIG. 1B is an end view of the left end support tube of FIG. 1;

DESCRIPTION OF THE INVENTION

Figure 1:
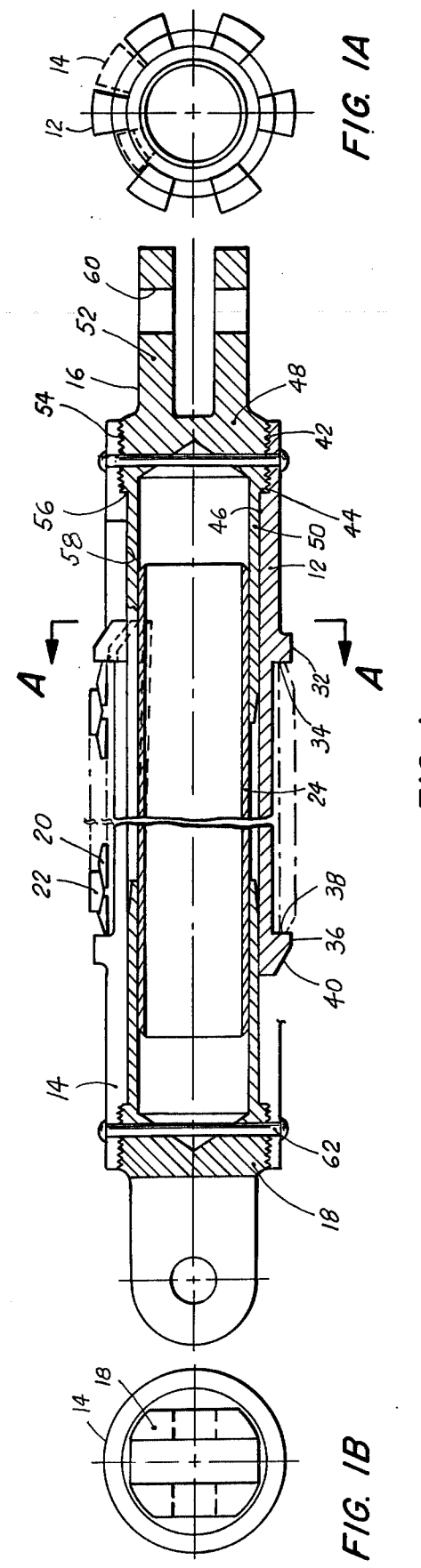
FIG. 1 is an assembly drawing of a recoil adapter embodying this invention.

The recoil adapter shown in FIG. 1 includes a right spindle tube 12, a left spindle tube 14, a right end support tube 16, a left end support tube 18, a stack of ring springs including alternate inner springs 20 and outer springs 22, and an inner support tube 24.

The spindle tubes 12 and 14 are identical and coaxial. Each tube includes an annular main body portion 26 and, integral therewith, a plurality, here shown as six, of longitudinally extending fingers 28. Adjacent fingers are peripherally spaced apart by a slot 30 whose peripheral width is at least equal to the peripheral width of a finger 28. Each finger has a medial, radially outwardly projecting boss 32 having a shoulder surface 34, serving as a compression stop; and a distal, radially outwardly projecting boss 36 having a shoulder surface 38, serving as a tension stop, and a ramp surface 40, serving as finger deflecting cam. The body portion is internally threaded at 42 with a shoulder at 44, and with a diametrical bore at 46.

The support tubes 18 and 16 are identical and coaxial with the spindle tubes. Each tube includes a main body portion 48, and, integral therewith, an annular portion 50, and a clevis portion 52. The body portion is externally threaded at 54 with a shoulder at 56, and with a diametrical bore at 58. The clevis has a transverse bore 60.

The spindle tubes 12 and 14 are mutually partially telescoped by interlacing their fingers, and an end support tube is threaded into each end and may be fixed by a pin 62 inserted through the aligned bores 46 and 58. Each support tube, e.g. 18, precludes inward deflection of the fingers of the other spindle tube, e.g. 12.

Figure 2:
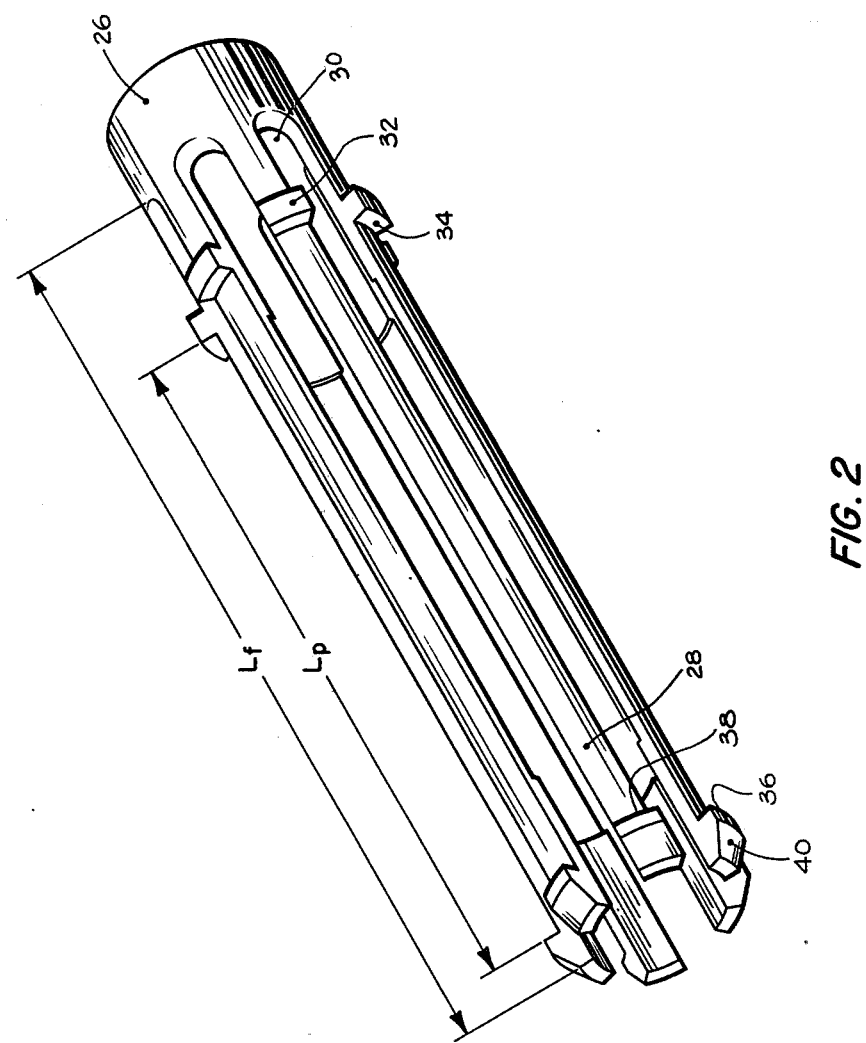
FIG. 2 is a perspective view of a spindle tube of the assembly of FIG. 1.

The stack of ring springs is disposed on and supported along its entire length by the telescoped tubes 12 and 14 between the tension stops 38 and the compression stops 34 of the right hand spindle tube 12 and the tension stops 38 and the compression stops 34 of the left handle spindle tube 14. The stack is preloaded to fit in this distance "$L_P$" as shown in FIG. 2. The recoil travel available is the distance "$L_R$" shown as the open slot length between the proximal end of the slot in one tube and the distal end of the finger of the other tube which rides in that slot as preloaded. The counter recoil travel available is within the distance between the tension stops 38 of the two tubes as preloaded.

Figure 3:
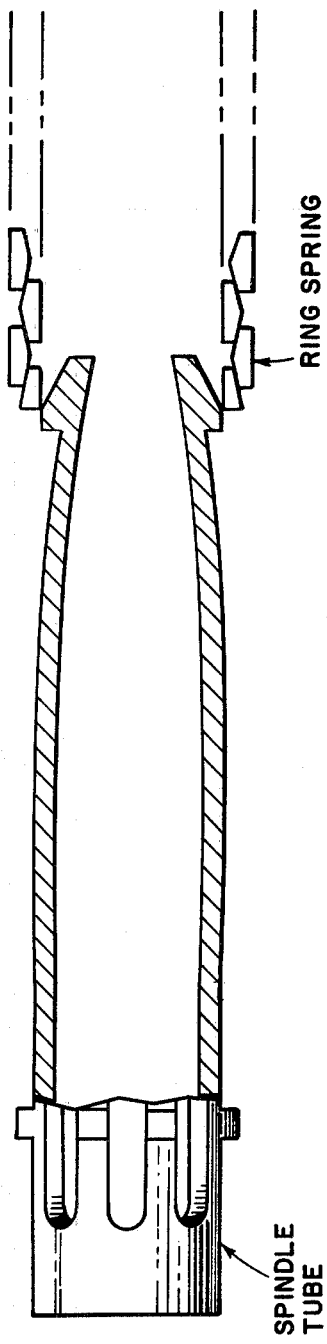
FIG. 3 is a longitudinal view in cross-section of the spindle tube ring springs of FIG. 1 in an intermediate stage of assembly.
Figure 4:
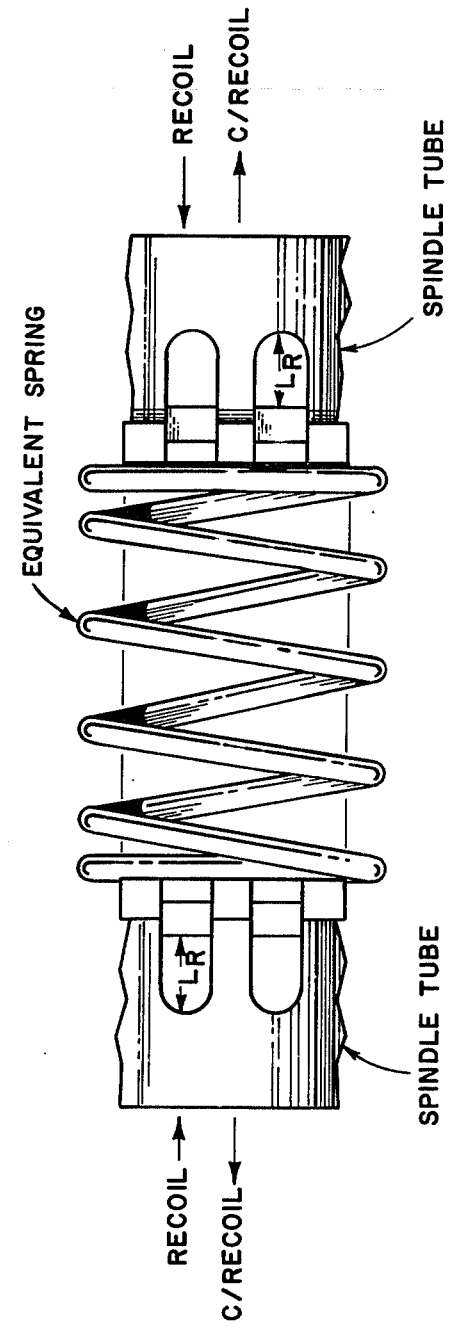
FIG. 4 is a schematic of the recoil adapter of FIG. 1.

In assembly, as shown in FIG. 3, the fingers of the tube are passed into the stack of ring springs, the cam surface 40 on each finger serving to deflect the distal end of the finger inwardly to pass within the rings. The other spindle 12 is now passed into the stack from the other end. The preloading force is then applied to the ends of the spindle tubes to compress the stack to permit the fingers of each spindle tube to clear the last ring spring and snap out. The stack of ring springs is now captured on and between the two spindle tubes. The inner support tube 24 is inserted through the open end of the spindle 12 or 14, and end tubes 16 and 18 are screwed in and pinned.

The function of the inner tube 24 is to preclude the possibility of buckling of the assembly under compressive, non-axial loading. The end tubes preclude the deflection inwardly of the fingers and loss of the ring springs. Even if the assembly is over-compressed, the ring springs remain captured on the fingers. There are no locking pieces or inserts to fall out and release the tubes from the springs. The stack of ring springs is fully supported along its entire length by the interlaced fingers, and cannot buckle independently of the tubes.

Although the embodiment of the invention shown utilizes a stack of ring springs, it will be appreciated that other spring means may be utilized, for example: Belleville discs, a helical compression spring or an elastomeric cylinder.

What is claimed is:

1. A double acting spring buffer comprising:
    tubular spring means having a longitudinal axis of compression and a first maximum diameter;
    a spindle assembly having a longitudinal axis of compression and extension, and having
    a first set of means engaged with and for compressing said spring means during compression of said spindle assembly, and
    a second set of means engaged with and for compressing said spring means during extension of said spindle assembly;
    said spindle assembly being disposed within said spring means and having a second maximum diameter no greater than said first maximum diameter.

2. A buffer according to claim 1 wherein:
    said spindle assembly includes
    first and second, coaxial, telescoping cylindrical members.

3. A double acting spring buffer comprising:
    tubular spring means having a longitudinal axis of compression and a first maximum diameter;
    a spindle assembly having a longitudinal axis of compression and extension, and having
    a first set of means for compressing said spring means during compression of said spindle assembly, and
    a second set of means for compressing said spring means during extension of said spindle assembly;
    said spindle assembly being disposed within said spring means and having a second maximum diameter no greater than said first maximum diameter and including
    first and second, coaxial, telescoping cylindrical members;
    each of said telescoping members including a cylindrical body portion having a plurality of longitudinally extending fingers disposed in an annular row, peripherally adjacent fingers being spaced apart by a slot which receives a respective finger of the other of said telescoping members each of said slots and fingers having a first longitudinal length ($L_F$).

4. A buffer according to claim 3 wherein:
    each of said telescoping members is tubular in shape.

5. A buffer according to claim 4 wherein:
    each of said fingers has a first distal, radially outwardly extending, projection, and a second, medial, radially outwardly extending projection, said first projections being disposed in a first annular row, said second projection being disposed in a second row which is longitudinally spaced from said first row by a second longitudinal length ($L_P$) which is less than said first length ($L_F$) by a third longitudinal length ($L_R$).

6. A buffer according to claim 5 wherein:
    when said buffer is in a neutral state,
    said first row of projections of one of said telescoping members is transversely aligned with said second row of projections of the other of said telescoping members, to provide a first group of projections,
    said second row of projections of said one telescoping member is transversely aligned with said first row of projections of said other telescoping member, to provide a second group of projections,
    said tubular spring means is disposed between and in abutment with said first and second groups of projections.

7. A buffer according to claim 6 wherein:
    when said buffer undergoes compression,
    said telescoping members undergo further mutual telescoping, and
    said spring means undergoes further compression by and between said second row of projections of said one telescoping member and said second row of projections of said other telescoping member.

8. A buffer according to claim 6 wherein:
    when said buffer undergoes extension,
    said telescoping members undergo reduced mutual telescoping, and
    said spring means undergoes further compression by and between said first row of projections of said one telescoping member and said first row of projections of said other telescoping member.

9. A buffer according to claim 6 wherein:
    said tubular spring means comprises a stack of ring springs, which stack is supported along its full length by said telescoping members.

10. A buffer according to claim 6 further including:
    an additional cylinder disposed within said telescoping members for precluding inward deflection of said longitudinally extending fingers.

11. A buffer according to claim 6 further including:
    a first additional cylinder fixed to said one telescoping member and underlying and precluding radially inward deflection of the distal ends of the longitudinally extending fingers of said other telescoping member;
    a second additional cylinder fixed to said other telescoping member and underlying and precluding radially inward deflection of the distal ends of the longitudinally extending finger of said one telescoping member.

12. A double acting spring buffer comprising:
    a tubular spring assembly having a longitudinal axis of compression;
    a spindle assembly including a pair of telescoping members each having a cylindrical body portion having a plurality of longitudinally extending fingers disposed in an annular row, peripherally adjacent fingers being spaced apart by a slot which receives a respective finger of the other of said telescoping members, said spindle assembly being disposed within and interengaging the ends of said spring assembly to compress said spring assembly when said spindle assembly undergoes either compression or extension.

13. A buffer according to claim 12 wherein:
    each of said pair of telescoping members includes first and second longitudinally spaced apart spring engaging projection means,
    said spring assembly being disposed between said first and second spring engaging projection means of both telescoping members.

14. A buffer assembly according to claim 13 wherein:
    said tubular spring assembly is the sole spring means in said buffer.

* * * * *